United States Patent
Kampe

(10) Patent No.: US 6,618,805 B1
(45) Date of Patent: Sep. 9, 2003

(54) SYSTEM AND METHOD FOR SIMPLIFYING AND MANAGING COMPLEX TRANSACTIONS IN A DISTRIBUTED HIGH-AVAILABILITY COMPUTER SYSTEM

(75) Inventor: Mark A. Kampe, Los Angeles, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/608,785

(22) Filed: Jun. 30, 2000

(51) Int. Cl.[7] .................................................. G06F 9/44
(52) U.S. Cl. ......................................... 713/1; 717/168
(58) Field of Search ..................... 713/1, 100; 709/220, 709/221; 714/2–13; 717/168–173

(56) References Cited

U.S. PATENT DOCUMENTS 5,619,614 A * 4/1997 Payne et al. ................... 706/1
6,256,773 B1 * 7/2001 Bowman-Amuah ............ 717/1
6,496,858 B1 * 12/2002 Frailong et al. ............ 709/221

FOREIGN PATENT DOCUMENTS

| WO | WO 94/01819 | 1/1994 |
| WO | WO 99/16271 | 4/1999 |
| WO | WO 99/46675 | 9/1999 |

* cited by examiner

Primary Examiner—Thomas M. Heckler
(74) Attorney, Agent, or Firm—William J. Kubida; Stuart T. Langley; Hogan & Hartson LLP

(57) ABSTRACT

A method and system that manage upgrades in a high-availability computer system by viewing the upgrade process as driving the system between a succession of stable configurations. The mechanism used by a described embodiment is an availability manager that is capable of ascertaining the state of each component and driving it toward a goal state by driving toward a succession of desired stable configurations. A high-level orchestration agent instructs the availability manager when a stable configuration has been reached and it is time to drive toward a next stable configuration.

20 Claims, 13 Drawing Sheets

SIMPLE UPGRADE SCENARIO:

| CONSIDER A SYSTEM WITH: | NAMES: | #: | STATUS: | STATE: |
|---|---|---|---|---|
| 2 HOST SLOT PROCESSORS | HSP1, HSP2 | 2N | HOT | STDBY |
| APPLICATION A | AA1, AA2 | 2N | HOT | STDBY |
| APPLICATION B | AB1, AB2 | 2N | HOT | STDBY |
| 2 NON HOST SLOT PROCESSORS | NHSP1, NHSP2 | 2N | HOT | STDBY |
| 3 PAYLOAD CARDS | PL1, PL2, PL3 | N+1 | | |

ALL MANAGEMENT APPLICATIONS AND THE AVAILABILITY
MANAGER RUN ON THE ACTIVE HSP.

THE INITIAL CONFIGURATION WOULD BE

HSP1 AS MASTER IN DOMAIN ONE
    DOMAIN ONE
        AA1    PRIMARY
        AA2    SECONDARY (TO AA1)
        AB1    PRIMARY
        AB2    SECONDARY (TO AB1)
        NHSP1  PRIMARY
        NHSP2  SECONDARY (TO NHSP1)
        PL1    PRIMARY
        PL2    PRIMARY
        PL3    SECONDARY (TO PL1, PL2)

THE SECOND TARGET CONFIGURATION WOULD BE

HSP1 AS MASTER IN DOMAIN ONE
    DOMAIN ONE
        AA1    PRIMARY
        AA2    SPARE
        AB1    PRIMARY
        AB2    SPARE
        NHSP1  PRIMARY
        NHSP2  SPARE
        PL1    PRIMARY
        PL2    PRIMARY
        PL3    SPARE
    HSP2 IN DOMAIN TWO
    DOMAIN TWO
        AA2    SECONDARY (TO AA1)
        AB2    SECONDARY (TO AB1)
        NHSP2  SECONDARY (TO NHSP1)
        PL3    SECONDARY (TO PL1 AND PL2)

*Fig. 8a*

THE THIRD TARGET CONFIGURATION WOULD BE

HSP2 AS MASTER IN DOMAIN TWO
HSP1 IN DOMAIN TWO

DOMAIN TWO
       AA2     PRIMARY
       AB2     PRIMARY
       NHSP2  PRIMARY
       PL3     PRIMARY
       AA1     SECONDARY (TO AA2)
       AB1     SECONDARY (TO AB2)
       NHSP1  SECONDARY (TO NHSP2)
       PL1     SPARE
       PL2     PRIMARY

DOMAIN ONE
       AA1     SPARE
       AB1     SPARE
       NHSP1  SPARE
       PL1     SPARE
       PL2     SPARE

THE FINAL CONFIGURATION WOULD BE VERY SIMILIAR TO THE INITIAL CONFIGURATION:

HSP1 AS MASTER IN DOMAIN TWO
HSP2 IN DOMAIN TWO

DOMAIN TWO
       AA1     PRIMARY
       AA2     SECONDARY (TO AA1)
       AB1     PRIMARY
       AB2     SECONDARY (TO AB1)
       NHSP1  PRIMARY
       NHSP2  SECONDARY (TO NHSP1)
       PL1     PRIMARY
       PL2     PRIMARY
       PL3     SECONDARY (TO PL1, PL2)

*Fig. 8b*

REVERSING THE PROCESS

INITIAL CONFIGURATION:

HSP1 AS MASTER IN DOMAIN TWO
   HSP2 IN DOMAIN TWO

DOMAIN TWO
| | |
|---|---|
| AA1 | PRIMARY |
| AA2 | SECONDARY (TO AA1) |
| AB1 | PRIMARY |
| AB2 | SECONDARY (TO AB1) |
| NHSP1 | PRIMARY |
| NHSP2 | SECONDARY (TO NHSP1) |
| PL1 | PRIMARY |
| PL2 | PRIMARY |
| PL3 | SECONDARY (TO PL1, PL2) |

SECOND CONFIGURATION:

HSP1 AS MASTER IN DOMAIN TWO
   HSP2 IN DOMAIN ONE

DOMAIN TWO
| | |
|---|---|
| AA1 | PRIMARY |
| AA2 | SPARE |
| AB1 | PRIMARY |
| AB2 | SPARE |
| NHSP1 | PRIMARY |
| NHSP2 | SPARE |
| PL1 | PRIMARY |
| PL2 | PRIMARY |
| PL3 | SPARE |

DOMAIN ONE
| | |
|---|---|
| AA2 | SECONDARY (TO AA1) |
| AB2 | SECONDARY (TO AB1) |
| NHSP2 | SECONDARY (TO NHSP1) |
| PL3 | SECONDARY (TO PL1 AND PL2) |

(NOTE: AS SOON AS THE HSP2 REBOOTS IN DOMAIN ONE, IT FALLS BACK TO THE PREVIOUS REGISTRY, APPROPRIATE TO THAT DOMAIN.)

*Fig. 9a*

THIRD CONFIGURATION:

HSP2 AS MASTER IN DOMAIN ONE
HSP1 IN DOMAIN ONE

DOMAIN ONE
- AA2     PRIMARY
- AB2     PRIMARY
- NHSP2     PRIMARY
- PL3     PRIMARY
- AA1     SECONDARY (TO AA2)
- AB1     SECONDARY (TO AB2)
- NHSP1     SECONDARY (TO NHSP2)
- PL1     SPARE
- PL2     PRIMARY

DOMAIN TWO
- AA1     SPARE
- AB1     SPARE
- NHSP1     SPARE
- PL1     SPARE
- PL2     SPARE

FINAL CONFIGURATION:

HSP1 AS MASTER IN DOMAIN ONE
HSP2 IN DOMAIN ONE

DOMAIN ONE
- AA1     PRIMARY
- AA2     SECONDARY (TO AA1)
- AB1     PRIMARY
- AB2     SECONDARY (TO AB1)
- NHSP1     PRIMARY
- NHSP2     SECONDARY (TO NHSP1)
- PL1     PRIMARY
- PL2     PRIMARY
- PL3     SECONDARY (TO PL1, PL2)

*Fig. 9b*

SYSTEM AND METHOD FOR SIMPLIFYING AND MANAGING COMPLEX TRANSACTIONS IN A DISTRIBUTED HIGH-AVAILABILITY COMPUTER SYSTEM

BACKGROUND

Technical Field

This invention relates generally to the reliability of data processing systems, and more particularly, to a system and method for managing upgrades of distributed data processing systems.

Background of the Invention

Computers are becoming increasingly vital to servicing the needs of business. As computer systems and networks become more important to servicing immediate needs, the continued availability of such systems becomes paramount. System availability is a measure of how often a system is capable of providing service to its users. System availability is expressed as a percentage representing the ratio of the time in which the system provides acceptable service to the total time in which the system is required to be operational. Typical high-availability systems provide up to 99.999 percent (five-nines) availability, or approximately five minutes of unscheduled downtime per year. Certain high-availability systems may exceed five-nines availability.

In order to achieve high-availability, a computer system provides means for redundancy among different elements of the system. Clustering is a method for providing increased availability. Clusters are characterized by multiple systems, or "nodes," that work together as a single entity to cooperatively provide applications, system resources, and data to users. Computing resources are distributed throughout the cluster. Should one node fail, the workload of the failed node can be spread across the remaining cluster members. An example of a clustered computer system is the Sun™ Cluster product, manufactured by Sun Microsystems, Inc.

Most high-availability service clusters (such as, for example, a network element in a telephone network) contain redundant components that can take over in case some components fail. Such redundant components are used not only to compensate for failed system components ("failover"), but are also used to make it possible to upgrade the system with no downtime. One preferred way to upgrade a system with redundant components is to use the so-called "rolling upgrade," in which nodes are taken down and upgraded one at a time. For a pair of nodes, a down node's redundant component operates in its place while the other node of the pair is down. One drawback to this method is that it requires all pairs of nodes to be full interoperable between old and new versions of the nodes. Thus, in general, a rolling upgrade can only be used in systems that are written and specified to have full interoperability between the old version and the upgrade version. Many application developers are not prepared to make this commitment. Another upgrade mode is a "split mode upgrade," where redundant components are taken out of service, and upgraded to a new release. There is then an exchange of states from the old components to the new components. During this transition, however, old components only provide service to old components, and new components only provide service to new components. The only interoperation is the exchange of states between old and new instances of components implementing the same service. After the new components take over, the old components can be upgraded. This method generally does not entail any loss of service, but may involve a temporary loss of redundancy or capacity.

As an example, a typical split mode upgrade might involve the following steps:

identify components to comprise the new domain fail any of these components that are busy over to spares take the new domain components out of service upgrade the new domain components form a new high-availability cluster of the upgraded elements match-make between old and new clusters perform state-transfer and cut-over from old to new cluster take old cluster elements out of service upgrade old cluster elements have upgraded old elements join new cluster re-establish preferred primary/secondary configurations.

Each of these steps is, by itself, a non-trivial operation that can fail, and the overall process must run to completion even if the process that is driving it fails halfway through the process. Generally, system upgrades involve the user specifying in detail which components have which actions done to them at which times. This involves detailed planning on the part of the system operator and does not lend itself to changes or modification of the upgrade process Thus, there is a need for a system that manages upgrades in a distributed processing system that is robust enough to handle failures during the upgrade process.

SUMMARY OF THE INVENTION

The present invention manages systems upgrades in a high-availability computer system by viewing the upgrade process as driving the system between a succession of stable configurations. Each of these stable configurations is a configuration in which the system can be safely left for an extended period of time without failure, if need be. The mechanism used by a described embodiment is an availability manager that is capable of ascertaining the state of each component and driving it toward a goal state by driving toward a succession of desired stable configurations.

If the availability manager fails in the middle of the process, the intermediate configuration (how far the upgrade has gotten) is of no importance because a new instance of the availability manager will simply look at the current and the desired configurations and start driving each individual component toward its desired state (and ultimately toward the system goal configuration).

If any of these operations fails (i.e., the control engine determines that it is not possible to drive the system to the desired configuration), unwinding the operation is accomplished by running backwards through the succession of configurations until an acceptable alternative configuration is reached. Thus, even if an upgrade cannot be accomplished, the availability of the system is maintained.

In one embodiment of the present invention, a high-availability computer system includes a plurality of nodes. Each node includes a plurality of components, which can be hardware or software entities within the computer system. An availability management system manages the operational states of the nodes and components.

The availability management system includes an orchestration agent that communicates with the availability manager and manages the high-level succession of configurations. When an orchestration agent decides that a target configuration has been achieved, it instructs the availability manager to start driving the components toward a the states of the next target configuration.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

BRIEF DESCRIPTION OF THE DRAWINGS

FIGS. 8(c) and 8(b) show an example of a succession of system configurations in an example upgrade.

FIGS. 9(a) and 9(b) show another example of a succession of system configurations in another example upgrade.

DESCRIPTION OF PREFERRED EMBODIMENTS

It will be understood that, although the present invention is described in the context of a high-availability distributed computer system, the present invention can be used in conjunction with a wide variety of computer systems and is not limited to a high availability system. In a first section, certain components of an example high-availability computer system are discussed. Then, in a second section, a system and method for upgrading the high-availability computer system is discussed. Lastly, in a third section, an example high-availability computer system is discussed.

I. An Example High-Availability Computer System

Figure 1:
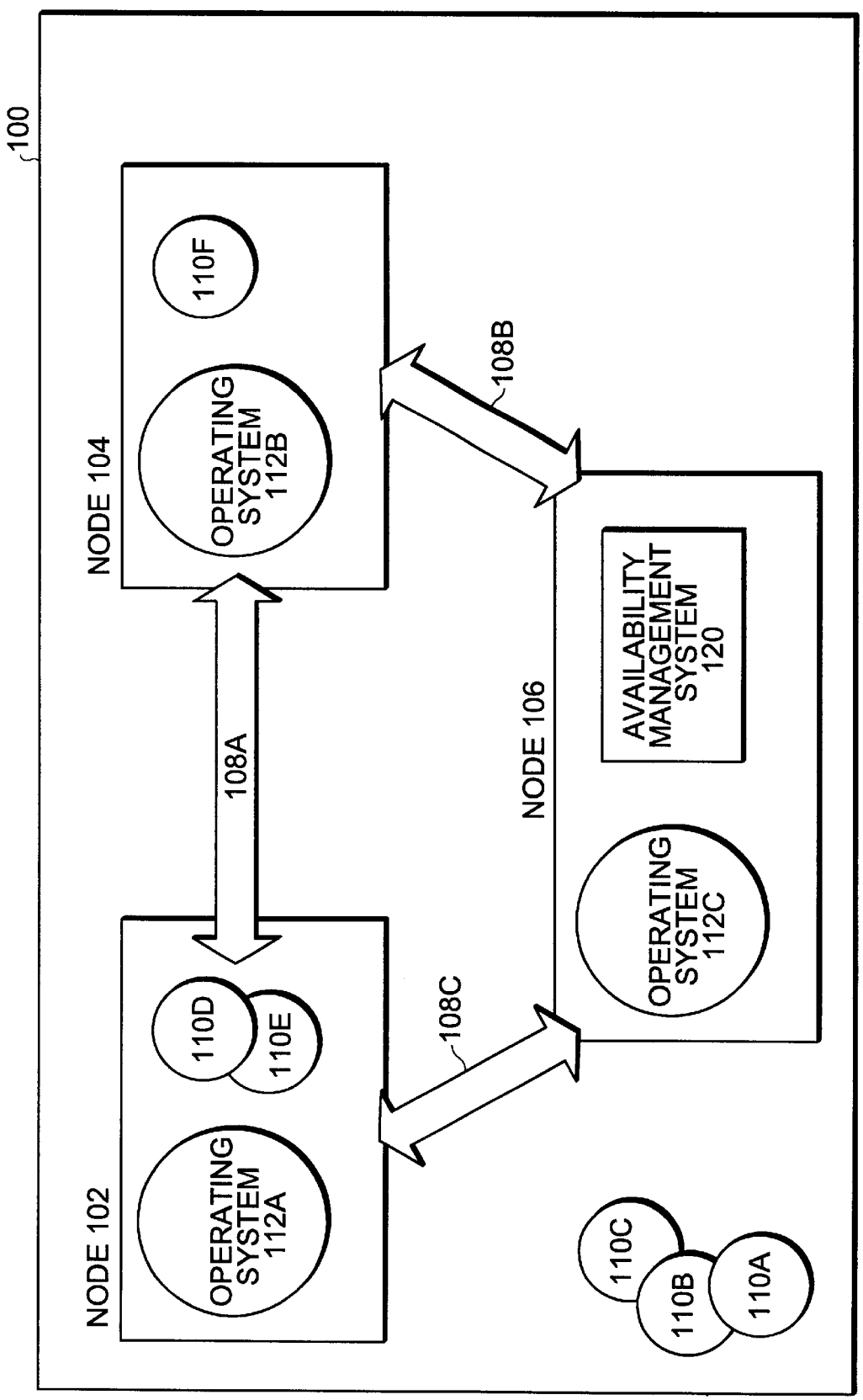
FIG. 1 is an overview of a cluster within a high available computer system in accordance with an embodiment of the present invention.

FIG. 1 shows an overview of a cluster arrangement within a computer system. Such a system would generally contain multiple clusters. A cluster 100 contains three nodes 102, 104 and 106. Each node is a processing location within the computer system. Nodes 102, 104 and 106 are connected to each other by a set of multiple redundant links 108 so that the failure of a single interconnect cannot isolate that node from its "peers" and hence from the cluster. Multiple redundant link 108A connects nodes 102 and 104. Multiple redundant link 108B connects nodes 104 and 106. Multiple redundant link 108C connects nodes 106 and 102.

Cluster 100 also contains a group of components 110 (10A, 1110B, 10C, 110D, 110E and 110F) representing hardware and software entities within the cluster 100. Components 110A, 110B, and 110C are located outside of the nodes of the cluster 100. However, components 110D and 110E are located in node 102, and component 110F is located in node 104. The availability of components 110 and nodes 102, 104 and 106 is managed by an availability management system 120 located in node 106. Availability management system 120 additionally manages the overall health of the cluster 100 and manages upgrades to the cluster, as described below. It will be understood by one of skill in the art that other clusters may contain more or fewer nodes and more or fewer components.

In one embodiment, each respective node 102, 104 and 106 contains a copy of the operating system 112A, 112B, 12C used within the cluster 100. A copy of the operating system 112 is stored in executable memory, and may be rebooted from disk storage (not shown) or from a computer network connected to the cluster 100. The operating system 112 may also be stored in nonvolatile random access memory (NVRAM) or flash memory. Individual nodes 102, 104 and 106 can each be rebooted with no effect on the other nodes.

Nodes 102, 104 and 106 cooperate jointly to provide high-availability service. Each node 102, 104 and 106, all of which are members of the cluster 100, is referred to as a "peer" node. If one of the peer nodes fails or has to be serviced, another peer node will assume his work, and the cluster 100 will continue to provide service. One role of the availability management system 120 is to detect failures within the system and orchestrate failure recovery. Availability management system 120 also manages upgrades as described below. Applications running on peer nodes interact through a location-independent distributed processing environment (DPE) so that work can be easily migrated from a failing node to another healthy peer node. The multiple redundant links 108 ensure that a failure by a single interconnect cannot isolate a node from its peers. For example, if a single interconnect within link 108A fails between nodes 102 and 104, there are other redundant interconnects within link 108A to continue service between nodes 102 and 104.

The availability management system coordinates operational states of components to implement a desired redundancy model within the computing system. Components within the system are able to directly participate in availability management activities, such as exchanging checkpoints with backup components, health monitoring, and changing operational states. However, the availability management system does not require that individual system components understand the redundancy model and fail-over policies such as, for example, who is backup for whom, and when a switch should take place.

Within the availability management system, an availability manager receives various reports on the status of components and nodes within the system. The availability manager uses these reports to direct components to change state, if necessary, in order to maintain the required level of service. Individual components may report their status changes, such as a failure or a loss of capacity, to the availability manager via in-line error reporting. In addition, the availability management system contains a number of other elements designed to detect component status changes and forward them to the availability manager.

The set of components 110 within cluster 100 are individual hardware or software entities that are managed within the cluster to jointly provide services. The availability of such jointly managed components 110A–F is greater than the availability of any single component. The availability management system 120 assigns available selected components to act as stand-bys for active components, and introduces the active and stand-by components to each other. For example, availability management system 120 could assign components 110D, 110E, and 110F to serve as stand-bys for active components 110A, 110B, and 110C. Components are introduced to one another by an exchange of messages with the availability management system 120.

Figure 2:
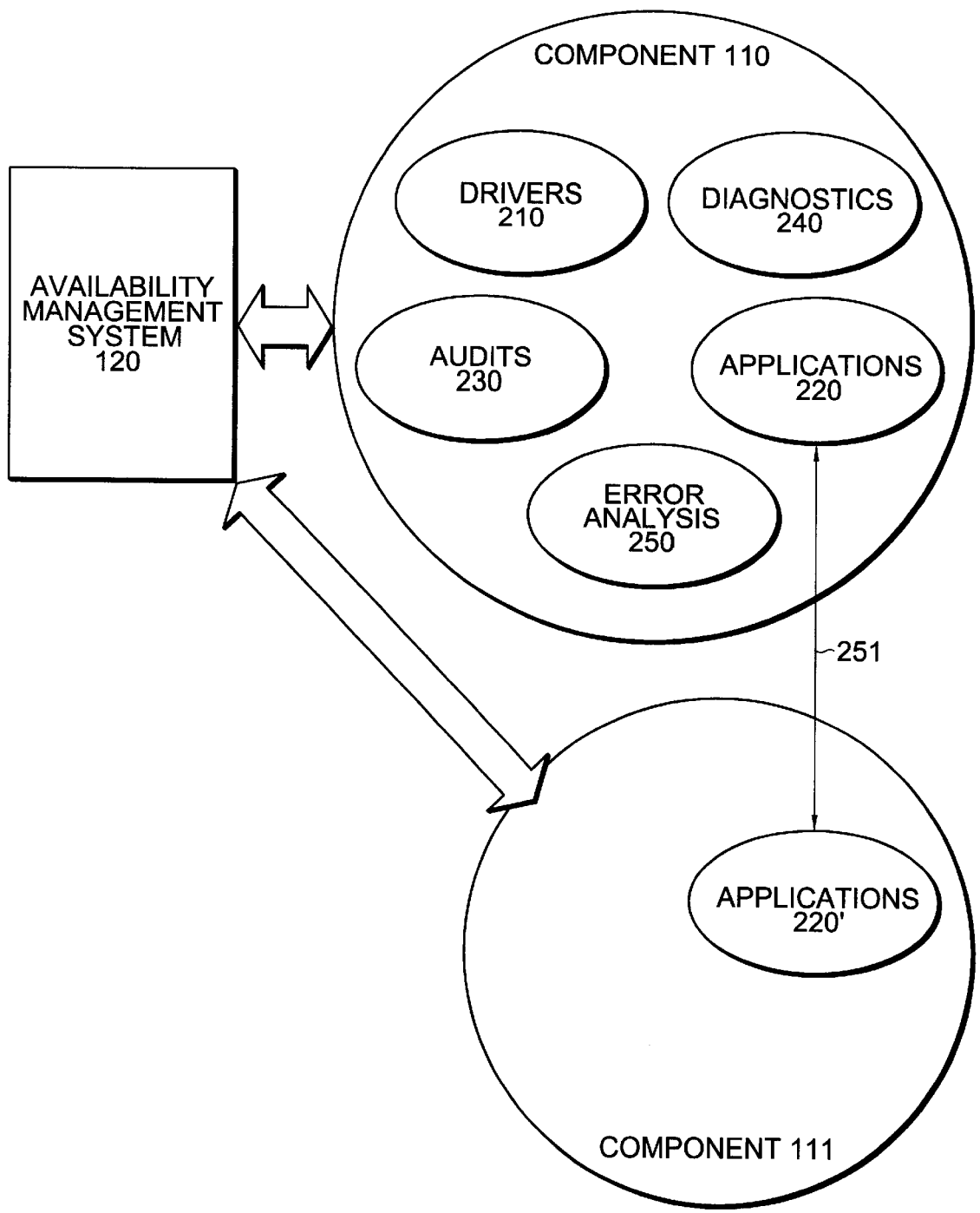
FIG. 2 is a block diagram of an individual component operating within a high-availability computer system architecture in accordance with an embodiment of the present invention.

FIG. 2 is a block diagram of an individual component operating within a highavailability computer system architecture in an embodiment of the present invention. Component 110 interacts with an availability management system 120. Component 110 contains physical device drivers 210 and applications 220. The drivers 210 and applications 220 comprise the functionality for which component 110 is designed. As will be evident to one of skill in the art, component 110 may contain a wide variety of different drivers 210 and applications 220. FIG. 2 also includes a second component 111, which includes another instance of application 220, i.e., application 220'. An arrow 251 represents an exchange of checkpoints between the applications 220 and 220'.

Availability management system 120 has limited visibility into the inner workings of component 110 and 110'. The components therefore assumes significant responsibility for their own management. For example, component 10 includes several features for internal fault detection. Component 110 has an auditing function 230 for detecting its own faults and reporting them to the availability management system 120. Component 110 also includes a diagnostics function 240 for determining whether component 110 itself is currently suitable for service. Component 110 further includes an error analysis function 250 for detecting, containing, and if possible repairing internal failures.

High-availability computer systems may be implemented using a variety of different component redundancy schemes. The availability management system 120 of the present invention is capable of supporting several different redundancy models. Different redundancy models may be used for different products utilizing the same availability management system 120. Individual components need not understand the redundancy model or the sensing and management networks and policies that control their use. The availability management system 120 directs components to change states, at the appropriate times, to implement the desired redundancy model. This enables a single component implementation to be used in a wide range of products.

Figure 3:
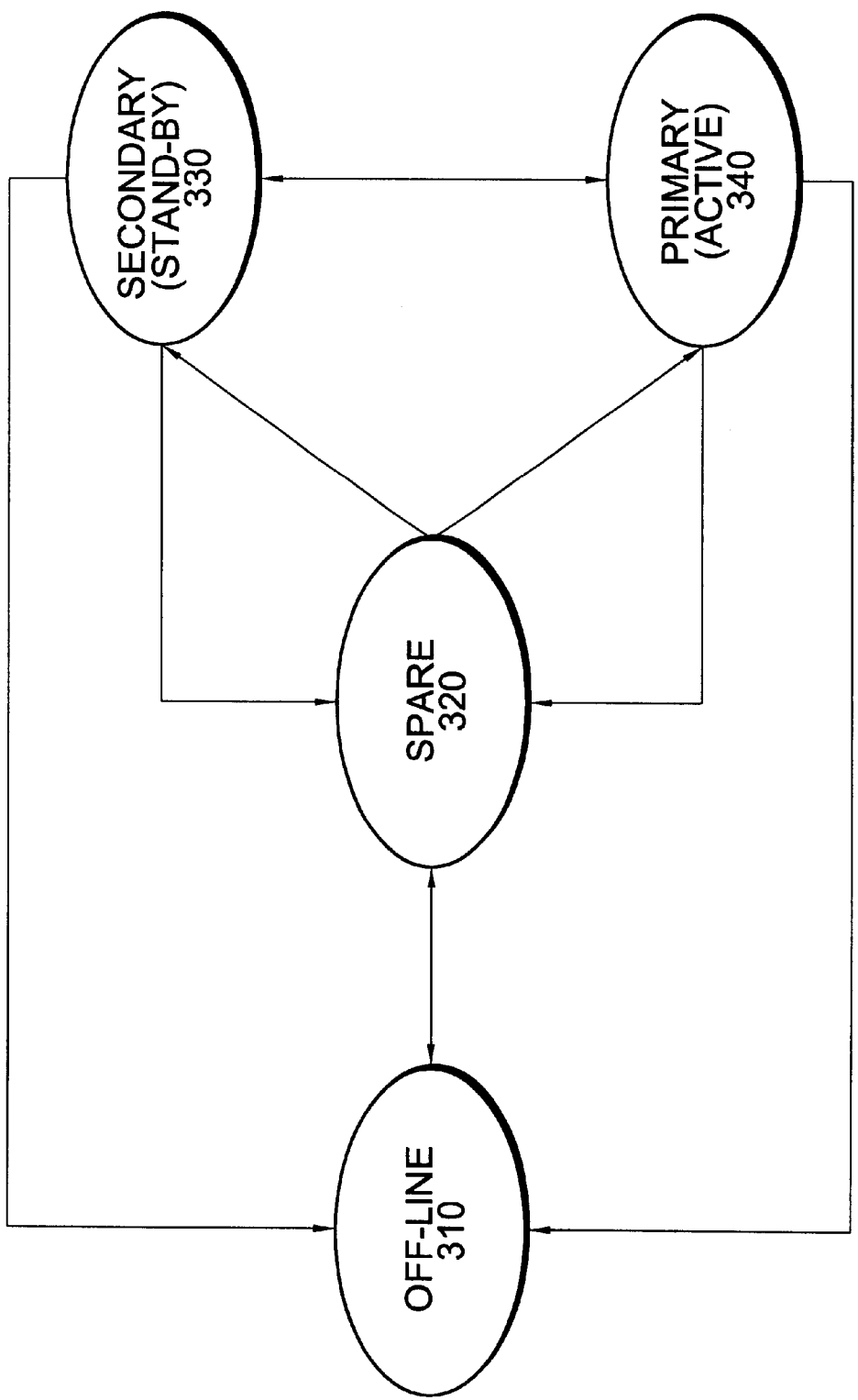
FIG. 3 is a diagram of the states that a component may take within a high-availability computer system architecture in accordance with an embodiment of the present invention.

FIG. 3 is a state diagram illustrating the states that a component can take within a high-availability computer system architecture in an embodiment of the present invention. In the described embodiment, a component may take one of four different states: off-line 310, spare 320, secondary (stand-by) 330, or primary (active) 340. Other states may be possible in other embodiments. An off-line 310 component can run diagnostics or respond to external management commands, but is not available to perform services. A spare 320 component is not currently performing any services but is available to do so at any time. A secondary 330 component may not actually be carrying system traffic, but it is acting as a stand-by for a primary 340 component, and the secondary 330 component is prepared to assume an active role at any time. A primary 340 component is active and providing service in the system. If a secondary 330 component has been assigned to it, the primary 340 component is also sending regular checkpoints to its secondary 330. The checkpoint messages keep the secondary 330 informed of the current status of the primary 340. The same checkpoint mechanism that is used to keep a secondary up-to-date in case of a fail-over can also be used to transfer state from a primary running a particular release to a secondary running another release.

Figure 4:
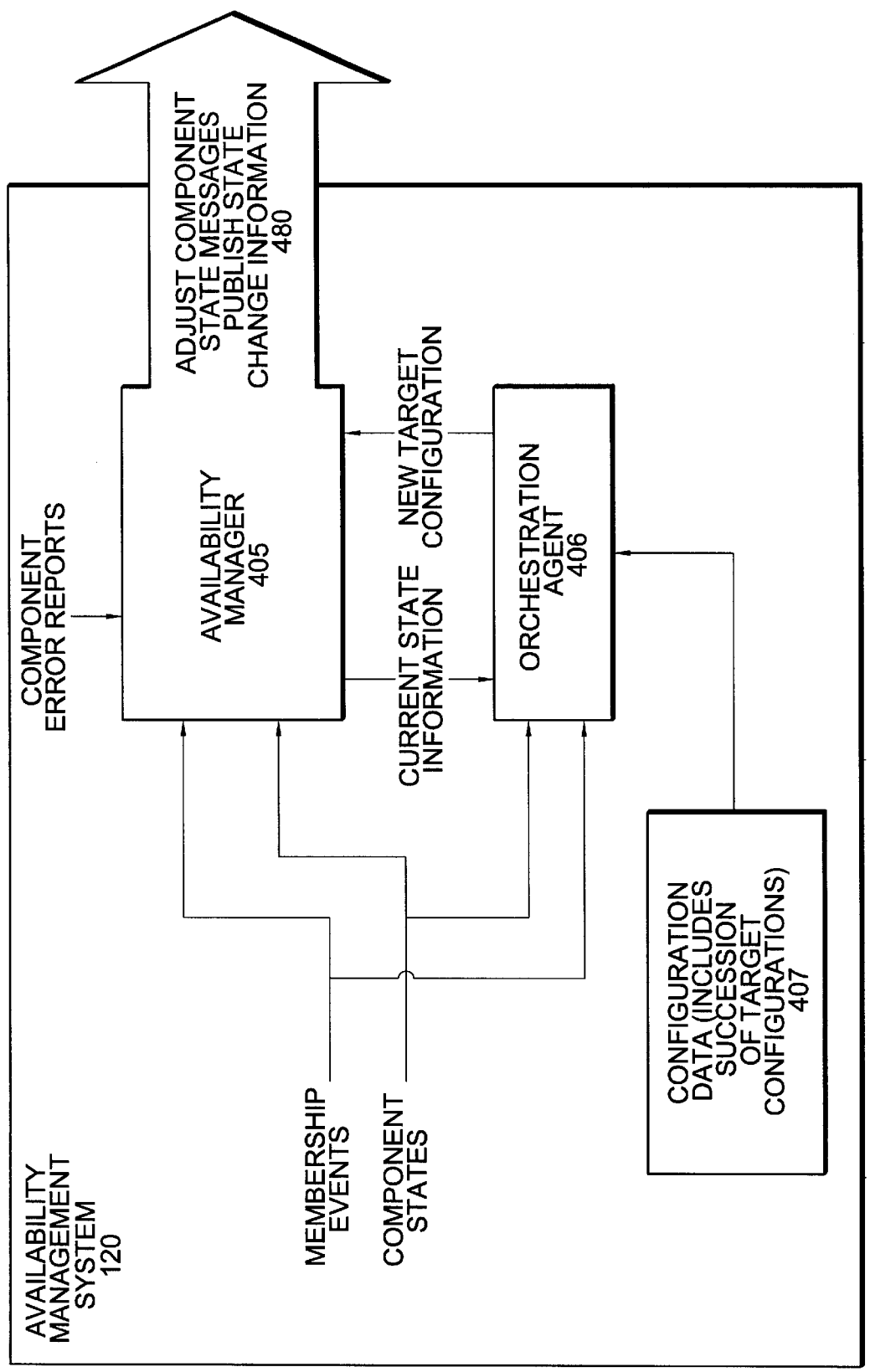
FIG. 4 is a diagram of components of an availability management system in accordance with an embodiment of the present invention.

FIG. 4 is a block diagram of an availability management system 120 in an embodiment of the present invention. Availability management system 120 includes at least: an availability manager 405 and an orchestration agent 406. It may optionally include separate configuration data 407 or this data may be incorporated into one of the elements 405, 406. The availability management system 120 assigns components to active and stand-by roles according to a wide range of possible redundancy models, without requiring the components to understand the overall system configuration. The availability management system 120 also assists components in the monitoring of their own health, without constraining how individual components ascertain their own health. The availability management system 120 further gathers information about component health from a variety of direct and indirect sources, and facilitates the exchange of checkpoints between active and stand-by components. The functionality of the availability management system as described herein is preferably implemented as software executed by one or more processors, but could also be implemented as hardware or as a mixture of hardware and software.

Error messages and other types of events are reported through different inputs into the components of the availability management system 120. Event and error reports are consolidated for final decision-making in the availability manager 405. The availability manager 405 outputs 480 component state messages and state change information to accomplish the management tasks of the availability management system 120. The availability manager 405 receives component error reports from other components n the system and passes current state information, including these component error reports, to orchestration agent 406. Orchestration agent 406 passes new target configuration information to availability manager 405. Configuration data, including a succession of target configurations is sent from configuration data 407 to orchestration agent 406.

II. System Upgrades

As discussed above, it is imperative that a high-availability system can be upgraded without having to shut down the system. In the described embodiment, availability manager 405 and orchestration agent 406 act together to control and manage system upgrades. A basic tenet of upgrades performed in accordance with the present invention is that the system passes through a succession of predefined stable configurations. A configuration specifies, for a particular service domain, which components should be in which states (primary, secondary, spare, etc.).

The present invention uses the concept of a "service domain." A node is, at any given time, a member of exactly one service domain. A node's domain is primarily defined by related to the software release from which it boots. Thus, if a node boots with version 1.0 of the system software, it is in the "release 1.0" service domain. In the described embodiment, changing the service domain of a node requires a reboot of the node. A cluster may be made up of multiple service domains. Different service domains may offer and participate in the same or different sets of services. If all services are fully operable, then a rolling upgrade is possible. If some services are not fully operable, then those services must be kept distinct between different domains (e.g., components in domain participate in a different instance of that service than components in domain2).

As an example, different service domains may have different registries, name services, and publish/subscribe lists, although this is not required. Different service domains each support their own registry because different versions of software may require different configuration data. Because applications in different service domains are not required to interoperate in the described embodiment, different service domains can have different name spaces and different publish/subscribe lists. Components "register" for a particular domain in response to instructions from availability manager 405. Information as to which domain contains which components is stored in a registry for that domain. When a component completes it initialization it registers to participate in the domain that is appropriate for the version of software it is running.

Even if they have different domains, nodes in a cluster are all members of the same cluster and acknowledge the same cluster master. Similarly, nodes in a cluster can all exchange messages with one another through a messaging service that is interoperable between domains. Similarly, all nodes in a cluster register with a single availability manager 405.

The following paragraphs describe a "split mode" upgrade in which the nodes and devices in the network are divided into two groups. One group continues to provide service, while the other is upgraded. Once the second group is ready, the active work is handed-off from the old group to the new one, after which the old group can be upgraded, and re-merged into a single network element again. These two groups have two different service domains corresponding to the old and upgraded software versions.

The upgrade process in divided into two levels. Progress between high-level configurations is controlled by an orchestration agent 406, while progress of the state of each component in a node within a configuration is controlled by availability manager 405. This division into levels results in a process that is much more robust in the face of failures of the controlling nodes. It also isolates the higher-level orchestration mechanism from the complexity of managing the individual nodes.

Figure 5:
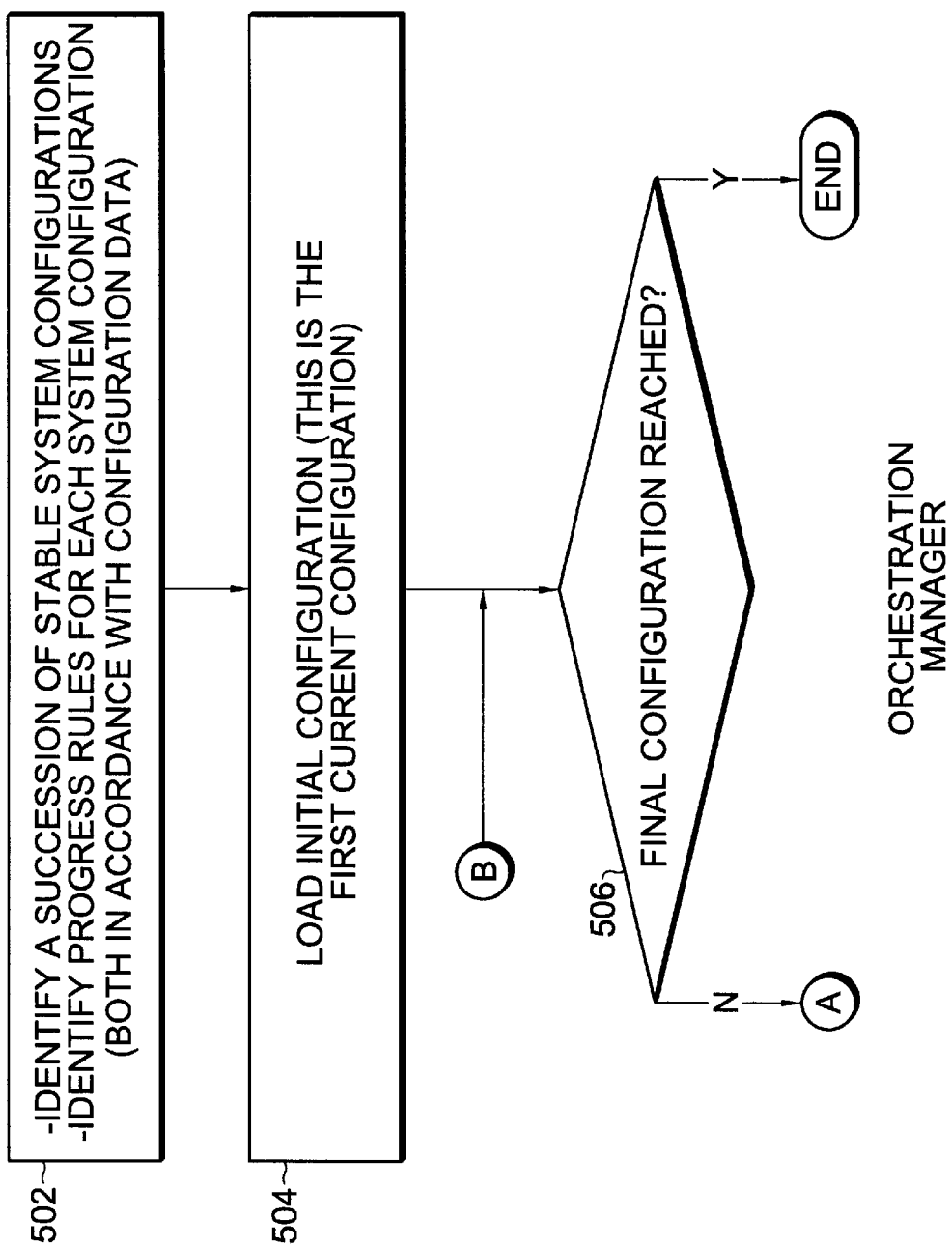
FIG. 5 is a flow chart of a method of performing an upgrade in a computer system, such as the system of FIG. 1.

FIG. 5 is a flow chart of a method of performing an upgrade in a system, such as the system of FIG. 1. In the described embodiment, the method is performed by orchestration agent 406. In element 502, orchestration agent 406 identifies a succession of stable system configurations. These configurations are preferably provided in Configuration Data 407, as shown in FIG. 5. A stable state is preferably defined as a state in which the system can safely run for a prolonged period of time. This definition arises out of the fact that failures may prevent the system from moving quickly on to the next configuration.

It should be noted that some of step 502 can be performed at design time, and other parts of step 502 can be performed at run time. Different embodiments may divide these activities differently. For a typical split-mode upgrade (as illustrated in FIGS. 8(a) and 8(b)), the general goals of each of the four successive configurations are fixed at design time. The only work done at run-time in the described embodiment is the assignment of particular components to the old and new domains. In a 2N redundant configuration, this can easily be done automatically (active components in the old domain, stand-bys in the new domain). For more complex configurations this assignment can be done automatically via product specific rules, or with human assistance. The progress rules in step 502 can also be defined partly at design time and partly at run-time. The design time decision would be to designate classes of components, whose failure would result in an automatic-fall-back, or stopping and awaiting operator intervention. The run-time decision would be to assign particular component instances to those classes. For some embodiments, this too can be entirely rule based (for example, the failure of a component for which other instances exist is not fatal). Other embodiments might require human input.

Configuration Data 407 may be determined at least partly by a human being, as in the described embodiment, or may be determined automatically or semi automatically under software control. In element 504 of FIG. 5, orchestration agent 406 loads an initial configuration that acts as a "current" configuration. This example configuration has 2N redundant components, where each has a backup and also has N+1 redundant components, where one back-up serves multiple primaries. Element 506 is the top of a loop and determines whether a final configuration has been reached. This final configuration also is preferably defined in Configuration Data 407 and represents a system configuration of an upgraded system. Orchestration agent 406 looks at the current states of the components (received in the embodiment from cluster membership monitor 420) and at component error reports (received in the embodiment from availability manager 405). This information is obtained from the availability manager 405 via predefined APIs and (optionally) via events subscribed to by orchestration agent 406. If a final configuration has not been reached, control passes to step A of FIG. 6.

Figure 6:
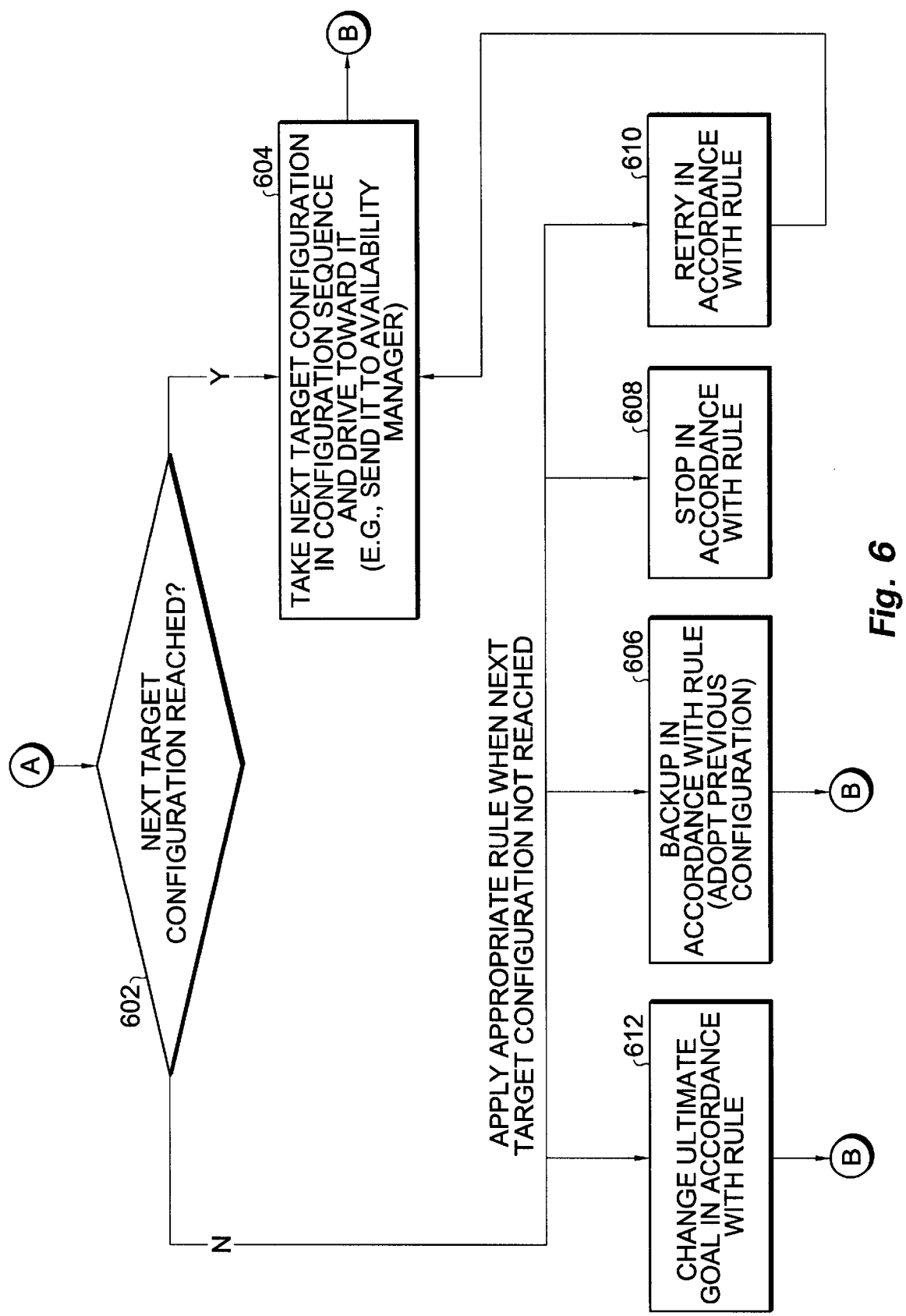
FIG. 6 is a flow chart of a method of performing an upgrade in a computer system, such as the system of FIG. 1.

FIG. 6 is a flow chart of a method of performing an upgrade in a system, such as the system of FIG. 1. In the described embodiment, the method is performed by orchestration agent 406 and is a continuation of the method of FIG. 5. If control reaches element 602, the system has not reached a final target configuration. Element 602 determines whether a "next" target configuration in the succession has been reached. The successive target configurations are defined in Configuration Data 407. Orchestration agent 406 looks at the current states of the components (received in the embodiment from cluster membership monitor 420) and at component error and status reports (received in the embodiment from availability manager 405). For example, the availability manager might generate an event reporting on its inability to complete a requested component state change. As another example, a component that was unable to boot in a new domain would publish an event to describe the problem before rebooting. As another example, too much time may have elapsed since a node was instructed to reboot and join a specific domain. In each of these cases, orchestration manager 406 would realize that the target configuration has not been reached.

If the next target configuration has been reached, in element 604 control passes to element B of FIG. 5. In element 604, orchestration manager 406 obtains a next target configuration from Configuration Data 407 and loads the new configuration target into the availability manager.

If the next target configuration has not been reached, in element 604 orchestration agent 406 consults its progress rules to determine what action (if any) to take. Each configuration has one or more associated progress rules that indicate that actions to take if various configurations are currently not meetable. Some examples of progress rules may include:

If HSP1 or HSP2 fails to rejoin, fall-back.
If NHSP1 or NHSP2 fails to rejoin, stop.
If AA1, AA2, AB1, or AB2 fails to come up, retry.
If 2 of PL1, PL2, or PL3, come up, continue.
If less than 2 of PL1, PL2, or PL3 come up, fall-back.

These actions may include changing the final/ultimate configuration sought (element 612), "backing up" to a different target configuration (element 606), stopping the upgrade and contacting a human operator or other diagnosis subsystem (element 608), and retrying to reach the target configuration (element 610).

Figure 7:
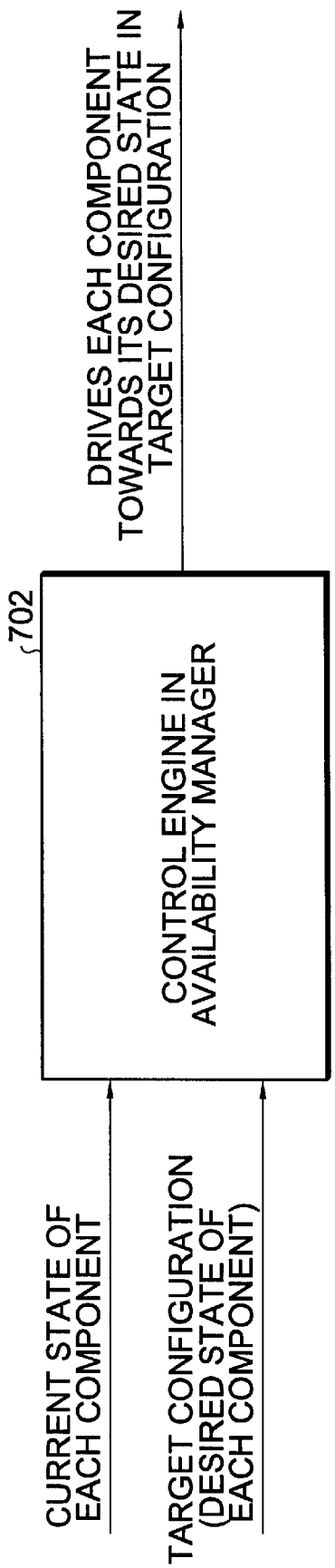
FIG. 7 is a block diagram of a control engine that helps control a system upgrade.

FIG. 7 is a block diagram of a software control engine 702 in availability manager 405 that helps control a system upgrade. In general, availability manager 405 will attempt to drive the system towards the current target configuration, changing component states and reassigning service roles as necessary. If, for example, the cluster master node containing availability manager 405 fails in the middle of the upgrade process, its successor cluster master will know (through a checkpoint mechanism) what the current target configuration is and will continue to drive the system towards it. The successor does not need to know which actions have already been taken, and which ones remained to be taken. All he needs to know is the current states of every component in the system and the target state. The concept of driving the system towards a target configuration lends itself to a very robust orchestration mechanism.

Engine 702 receives information concerning the current states of components in the system. Availability manager 405 periodically receives a new target configuration from orchestration agent 406. Each new target configuration includes the desired component states of the target configuration. In accordance with internal rules or tables (see, for example, FIG. 8), availability manager 405 drives each component in turn toward its desired state. In the described embodiment, this means that availability manager 405 sends adjust component state messages and publishes state change information as shown by arrow 480 of FIG. 4. For example, availability manager 405 may issue a "quiesce" command to a component, indicating that the component is to "become quiescent." Similarly, availability manager 405 may issue a "become secondary" command to a component indicating that the component should consider itself secondary to a defined primary component. If any command from the availability manager 405 fails, the availability manager will generate a reconfiguration error and attempt to ensure that the service in question continues.

FIGS. 8(a) and 8(b) show an example of a succession of system configurations in an example upgrade. In the example, the system contains two host slot processors HSP1 and HSP2, each of which runs a copy of application A (AA1 and AA2) and a copy of application B (AB1 and AB2). The example system also includes two non-host slot processor SHSP1 and SHSP2 and three payload cards PL1, PL2, and PL3. In this example, the availability manager and orchestration manager run on the active HSP. In the example, there are 2N slot processors, 2N copies of application A, 2N copies of application B, 2N copies of non host slot processors, and N+1 payload cards.

A high level overview of the four target configurations would be:

first: the initial, typical running configuration with active and standby components second: split off the stand-by components to form a new domain, where they will again be secondaries to primaries in the old domain third: hand-off primary responsibilities from the components in the old domain to their secondaries in the new domain fourth: move the (now idle) components from the old domain into the new domain As shown in the figure, an initial configuration would have HSP1 as master in service domain one, which includes an instantiation of HSP2, AA1 (primary state), AA2 (secondary state), AB1 (primary state), AB2 (secondary state), NHSP1 (primary state), NHSP2 (secondary state), PL1 (primary state), PL2 (primary state), PL3 (secondary state). This first configuration is the configuration at the beginning of the upgrade process.

A second, target configuration would have HSP1 as master in service domain one and HSP2 as master in service domain two. Service domain one includes: AA1 (primary state), AA2 (spare state), AB1 (primary state), AB2 (spare state), NHSP1 (primary state), NHSP2 (spare state), PL1 (primary state), PL2 (primary state), PL3 (spare state). To achieve this configuration for domain one, availability manager 405 has driven AA2, AB2, NHSP2, and PL3 from secondary states to respective states of "spare." Service domain two (upgraded components) includes: AA2 (secondary state), AB2 (secondary state), NHSP2 (secondary state), and PL3 (secondary state). To achieve this configuration for domain two, orchestrating agent 406 waits until the indicated components are all in spare status in domain one and then instructs HSP2 and NHSP2 to reboot the new release in domain two. Note that in this embodiment, components moving into domain two are configured as spare in the old domain (domain one). This permits their reintegration into domain one if they automatically fall back as a result of a failure to properly come up in the new domain.

A third, target configuration would have HSP2 as master in service domain two and HSP1 in service domain two. Service domain two includes: AA2 (primary state), AA1 (secondary state), AB2 (primary state), AB1 (secondary), NHSP2 (primary state), NHSP1 (secondary state), PL3 (primary state), PL1 (spare state) and PL2 (spare state). To achieve this configuration for domain two, availability manager 405 has driven AA2, AB2, NHSP2, and PL3 from states of secondary to respective states of primary. Service domain one includes: AA1 (spare state), AB1 (spare state), NHSP1 (spare state), and PL2 (spare state). To achieve this configuration for domain one, orchestrating agent 406 waited until the indicated components were all in spare status and then instructed HSP1 and NHSP1 to reboot the new release in domain two.

A fourth, target configuration is very similar to the initial configuration. HSP1 is master in service domain two and HSP2 is in service domain two. Service domain two (corresponding to the upgraded release) includes: AA1 (primary state), AA2 (secondary), AB1 (primary state), AB2 (secondary), NHSP1 (primary state), NHSP2 (secondary), PL1 (primary state), PL2 (primary) and PL3 (secondary). Thus, the original primaries are returned to primary status in the new domain. (Other embodiments may choose to leave the former primaries as secondaries.)

FIGS. 9(a) and 9(b) show another example of a succession of system configurations in an example upgrade. This example shows a succession of configurations specified for a "backward" upgrade to return to a previous release. The example shows an initial configuration and three successive configurations. The final configuration results in the system being returned to a previous version, corresponding to service domain one.

It will be understood that the described embodiment includes a software and configuration upgrade mechanism that is capable of down-loading new software and new configuration data into an inactive partition of every boot—and application storage device. It will also be understood that the described embodiment includes a fail-safe booting mechanism that is capable of booting any node from either of the two boot partitions. When a system including a fail-safe booting mechanism performs a fail-safe boot, on an uncommitted release, it does so in a tentative fashion. If the system is unable to rejoin the cluster within a predetermined time period, it will automatically reboot from the precious release. A hardware watchdog timer enables the system to recover even from a bad operating system release that causes the entire node to fail.

In at least one embodiment of the present invention, the target configurations are automatically generated. For 2N redundant components, it is simple to define the split groups; preferred primaries are placed in the old domain and preferred secondaries are placed in the new domain. For N+1 redundant components, the described embodiment requires that the basic redundancy configuration of the system include explicit designations of which components are to be assigned to the old and new domains. For components without redundancy, the system preferably specifies that these are shut down during a split mode upgrade.

It will be understood that the functionality described herein can be implemented using a wide variety of technologies. In the described embodiment, the functionality of the availability management system, including the availability manager and the orchestration agent are implemented in computer software, executable by one or more processors of the illustrated cluster computer system. Other embodiments may implement the functionality as a combination of hardware or software or may implement the functionality shown without explicitly dividing the functionality between an availability manager and an orchestration agent. As will be apparent to a person of ordinary skill in the art, the software implementing this functionality can be stored on a computer readable medium, such as a computer memory, a disk, a CD, a dvd, or similar computer readable media. The software can also be transmitted over a transmission line prior to being executed.

Figure 10:
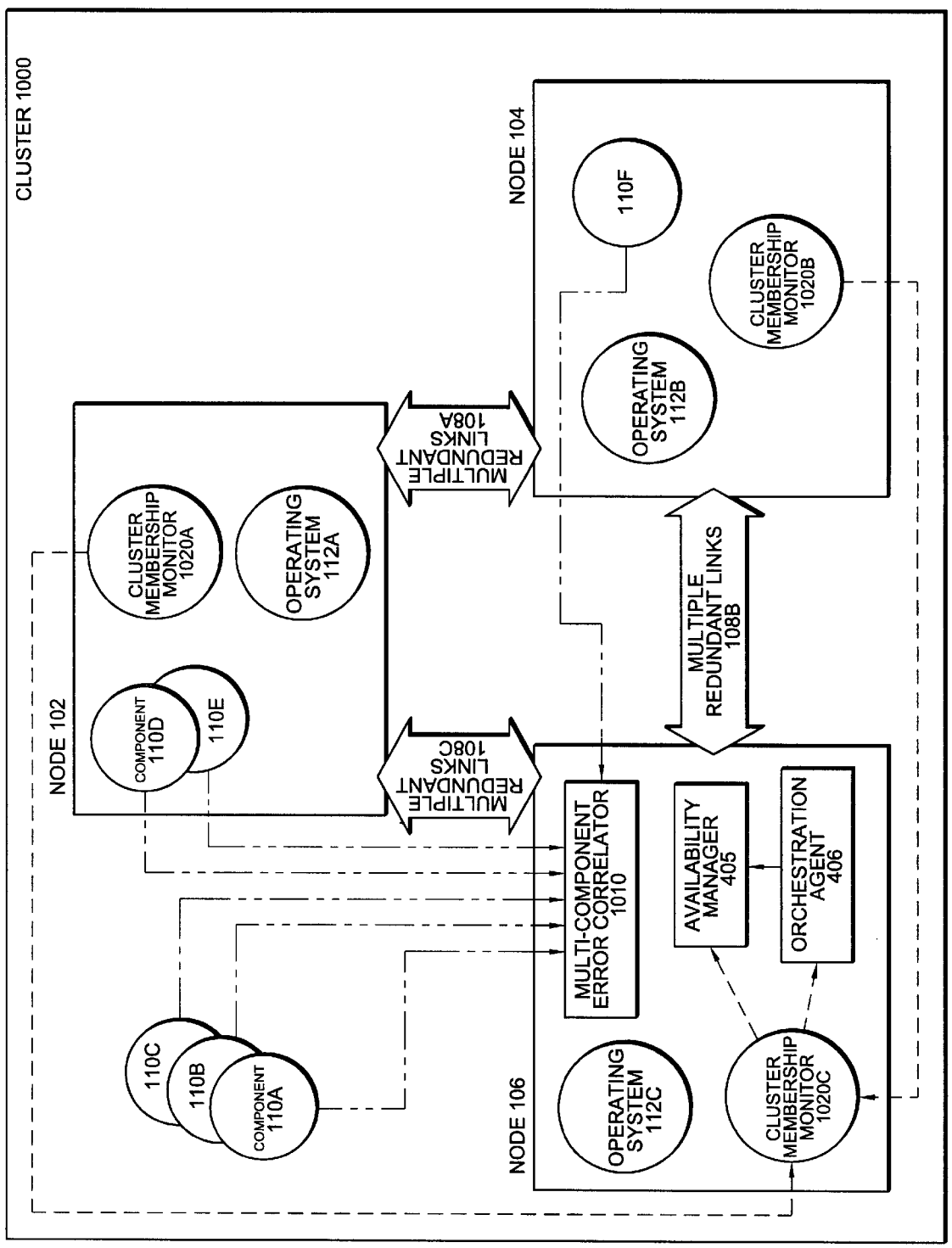
FIG. 10 is a block diagram of a cluster within a computer system, including an availability management system in accordance with an embodiment of the present invention.

FIG. 10 shows an embodiment wherein a centralized availability management system is structured within the distributed computing environment of a cluster 1000. It will be understood that the system of FIG. 10 is shown only by way of example of a system including the current invention and is not to be taken in a limiting sense. Information relating to component availability and upgrade is centralized in a single availability manager 405. This allows availability decisions to be made in a global fashion, taking into account information from the entire cluster. Orchestration agent 406 is also important in upgrade activities as described below.

Cluster 1000 contains three peer nodes 102, 104 and 106. Each node is interconnected with its peer nodes by a set of multiple redundant links 108. Each node includes a copy of the operating system 112. The cluster 1000 also includes a set of components 110. Availability manager 405 located in node 106 receives inputs from various parts of the cluster and manages the availability of the nodes 102, 104 and 106 and the set of components 110. Availability manager 405 could alternately be located in node 102 or node 104, if, for instance, the master node 106 failed.

Each node 102, 104 and 106 contains a cluster membership monitor 1020A, 1020B and 1020C, respectively. Each cluster membership monitor 1020 maintains contact with all other cluster nodes, and elects one of the nodes to be the "cluster master." The cluster master detects new nodes and admits them to the cluster, and uses heartbeats to detect failures of existing members of the cluster. A heartbeat is a short message exchanged regularly to confirm that the sender is still functioning properly. The cluster master also acts as a central coordination point for cluster-wide synchronization operations. In cluster 1000, node 106 is the cluster master. Cluster membership monitor 1020A provides a heartbeat for node 102 to cluster membership monitor 1020C. Cluster membership monitor 1020B provides a heartbeat for node 104 to cluster membership monitor 1020C. The availability manager 405 typically runs on the cluster master node, to avoid numerous race conditions and distributed computing issues.

When a node becomes non-responsive, the cluster membership monitor responsible for monitoring that node reports this error to the availability manager 405. For example, if node 104 becomes non-responsive, cluster membership monitor 1020C will no longer receive a heartbeat for node 104 from cluster membership monitor 1020B. Cluster membership monitor 1020C would report this error to the availability manager 405. In an alternative embodiment of the availability management system with only a single node, a cluster membership monitor is not required.

Cluster 1000 also contains a multi-component error correlator (MCEC) 1010 located in node 106. Components 110 report component status changes to the MCEC 1010. The MCEC 1010 receives both specific and non-specific event reports and attempts to infer the system failure that has caused these events. For example, there are situations where an error cannot reasonably be immediately isolated to a particular component, because the symptoms seen by any one component are inconclusive. Only correlating reports from multiple components can identify the real problem. In the embodiment shown in FIG. 10, the MCEC 1010 is located on the cluster master node 106. However, in another embodiment the MCEC 1010 may be located on a different node. The MCEC 1010 uses pre-configured rules to decide whether or not a sequence of events matches a known pattern, corresponding to a known error. When a match is found, the MCEC 1010 reports the error to the availability manager 405 as a component error report. Examples of component error reports include a component failure and a component loss of capacity. The MCEC 1010 may also perform filtering actions upon the event reports received.

Figure 11:
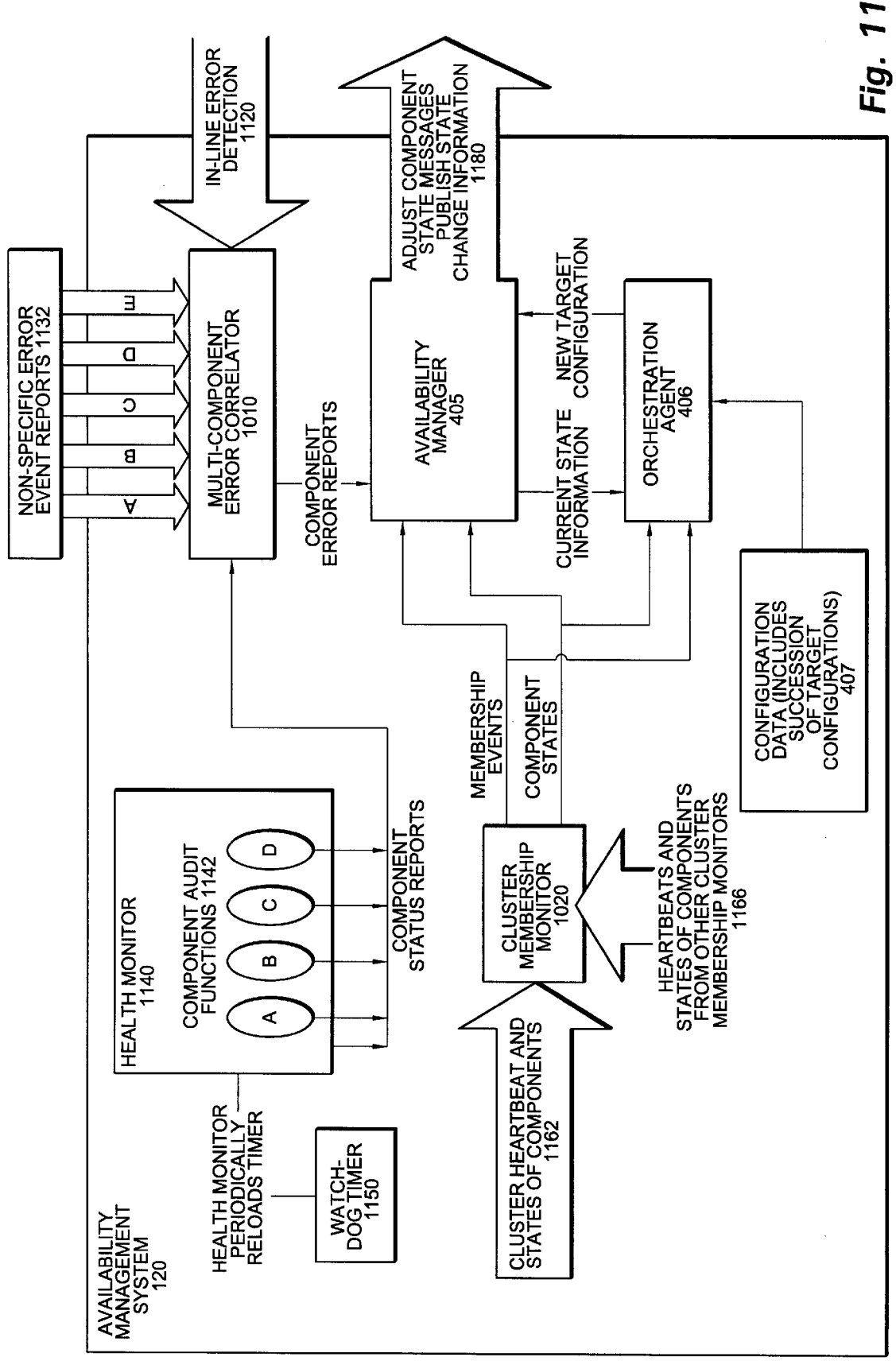
FIG. 11 is a block diagram of the availability management system of FIG. 10 in accordance with an embodiment of the present invention.

FIG. 11 is a block diagram of an availability management system 1120 in an embodiment of the present invention. An availability management system 1120 includes: an availability manager 405, an orchestration agent 406, a multi-component error correlator (MCEC) 1010, a health monitor 1140, a watch-dog timer 1150, and a cluster membership monitor 1020. The availability management system 1120 assigns components to active and stand-by roles according to a wide range of possible redundancy models, without requiring the components to understand the overall system configuration. The availability management system 1120 also assists components in the monitoring of their own health, without constraining how individual components ascertain their own health. The availability management system 1120 further gathers information about component health from a variety of direct and indirect sources, and facilitates the exchange of checkpoints between active and stand-by components. The functionality of the availability management system as described herein is preferably implemented as software executed by one or more processors, but could also be implemented as hardware or as a mixture of hardware and software.

Error messages and other types of events are reported through different inputs into the components of the availability management system 1120. Event and error reports are consolidated for final decision-making in the availability manager 405. The MCEC 1010 and the cluster membership monitor 1120 report to the availability manager 405. This information includes, without limitation, membership events and component states from cluster membership monitor 1120 and further includes, without limitation, component error reports from Multi-Component Error Correlator 1110. The availability manager 405 outputs 1180 component state messages and state change information to accomplish the management tasks of the availability management system 120.

The operation of the individual components within the availability management system 120 shown in FIG. 5 will now be discussed in further detail. Where applicable, reference will be made to additional figures providing more detail on the operation of individual components within the availability management system 120.

The MCEC 1010 receives both specific and non-specific error event reports and component status change reports. The MCEC 1010 uses pre-configured rules to search for known patterns in the reported events. When a reported event sequence matches a known pattern, the MCEC 1010 is able to infer a particular error, such as a component failure or a component becoming non-responsive. The MCEC 1010 then reports the error as a component error report to the availability manager 405.

Individual components report specific errors to the MCEC 1010 in multiple ways. Non-specific error event reports 1132, which may not have a known correlation to any specific component, are sent to the MCEC 1010. In-line error detection 1120 takes place while a component is performing tasks. During the performance of a task, an error is detected by the component and the MCEC 1010 is notified of the particular component status change by the component directly. Additionally, a component may perform periodic self-audits 142, which are performed at specified intervals whether the component is performing a task or is currently idle. Errors detected during component audits 1142 are reported to the MCEC 1010 as component status change reports. A health monitor 1140 aids in the performance of component-specific audit functions.

In one embodiment, all error reports from all components (both specific and non-specific) are sent to the MCEC 1010. This provides a centralized decision making location. However, in another embodiment, multiple MCECs may be used in a network of error correlators. In a multiple MCEC system, different MCECs receive error reports by subscribing to a certain set of event reports distributed via a publish/subscribe event system. A publish/subscribe event system automatically distributes event notifications from an event publisher to all processes (on all nodes) that have subscribed to that event. The publish/subscribe event system permits interested processes to obtain information about service relevant occurrences like errors, new devices coming on-line, and service fail-overs. The use of multiple MCECs allows flexibility in the availability management system 1120. For example, an additional MCEC may be added more easily to deal with certain problems without changing the existing MCEC structure. Multiple MCECs may all be located on a single common node, or they may be located on different nodes.

The MCEC 1010 is a rule-based event filter. In one embodiment, the rules may be implemented in compiled code within the MCEC 1010, or in another embodiment may be expressed in a rule language that is interpreted by the MCEC 1010. The MCEC 1010 filters out stale, redundant, and misleading event reports to avoid unnecessary or ineffective error messages being sent to the availability manager 405. For example, if ten different components all report the same event to the MCEC 1010, only one error message needs to be passed along to the availability manager 405. In another example, the MCEC 1010 can also perform temporal correlations on event messages to determine that a particular error message to the availability manager 405 is not having the desired effect. If the MCEC 1010 discovers that the same component has failed a successive number of times, the MCEC 1010 may report an entire node failure to the availability manager 405, to cause a rebooting of the entire node instead of another (probably fruitless) rebooting of the failed component. It will be understood by one of skill in the art that many different sets of rules may be implemented in the MCEC 1010.

In summary, the described embodiment of the present invention drives components in the system to achieve successive target configurations until a final goal configuration is reached. An orchestration agent controls high-level upgrade management, instructing an availability manager when it is time to move to begin driving toward a next target configuration. The availability manager controls lower-level upgrade management, driving individual components in the nodes toward the current target configuration.

Although the invention has been described in considerable detail with reference to certain embodiments, other embodiments are possible. As will be understood by those of skill in the art, the invention may be embodied in other specific forms without departing from the essential characteristics thereof. For example, the availability management system may be implemented in a non-clustered computer system architecture. Also, additional different component states may be implemented and managed by the availability management system. Accordingly, the present invention is intended to embrace all such alternatives, modifications and variations as fall within the spirit and scope of the appended claims and equivalents.

I claim:

1. An upgrade method for a computer system including a plurality of components, wherein each component has an operational state, comprising:

providing a succession of stable target configurations of the system, a configuration specifying a state of one or more components in the system;

providing a progress rule for each target configuration;

driving the system from a current stable target configuration to a next stable target configuration in the succession; and applying an associated progress rule if the system fails to reach a stable target configuration.

2. The method of claim 1, wherein a stable target configuration is defined as a configuration in which the system can operate for a predefined length of time.

3. The method of claim 1, wherein the computer system is a high-availability computer system.

4. The method of claim 1, wherein a target configuration includes a plurality of states of system components.

5. The method of claim 4, wherein the plurality of states includes the states of at least: primary, spare, and secondary.

6. The method of claim 1, further including an availability manager, responsive to receipt of the current target configuration, that drives the components toward the states that make up the current target configuration.

7. The method of claim 6, wherein the availability manager publishes component operational states to other nodes within the highly available computer system.

8. The method of claim 6, wherein the orchestration agent receives published component operational states from the availability manager.

9. The method of claim 1, wherein a state of a component is active.

10. The method of claim 1, wherein a state of a component is standby.

11. The method of claim 1, wherein a state of a component is spare.

12. The method of claim 1, wherein a state of a component is off-line.

13. The method of claim 1, wherein a component status change is a component failure.

14. The method of claim 1, wherein failure to reach a stable target configuration is caused by a component loss of capacity.

15. The method of claim 1, wherein a failure to reach a stable target configuration is caused by a new component available.

16. The method of claim 1, wherein failure to reach a stable target configuration is caused by a request to take a component off-line.

17. An upgrade apparatus for a computer system including a plurality of components, wherein each component has an operational state, comprising:

a software portion configured to provide a succession of stable target configurations of the system, a configuration specifying a state of one or more components in the system;

a software portion configured to provide a progress rule for each target configuration;

a software portion configured to drive the system from a current stable target configuration to a next stable target configuration in the succession; and a software portion configured to apply an associated progress rule if the system fails to reach a stable target configuration.

18. The apparatus of claim 17, wherein a stable target configuration is defined as a configuration in which the system can operate for a predefined length of time.

19. A computer program product, on a computer readable medium, that provides an upgrade method for a computer system including a plurality of components, wherein each component has an operational state, the acts performed by the computer program product comprising:

providing a succession of stable target configurations of the system, a configuration specifying a state of one or more components in the system;

providing a progress rule for each target configuration;

driving the system from a current stable target configuration to a next stable target configuration in the succession; and applying an associated progress rule if the system fails to reach a stable target configuration.

20. The computer program product of claim 19, wherein a stable target configuration is defined as a configuration in which the system can operate for a predefined length of time.

* * * * *